United States Patent [19]

Fujita et al.

[11] Patent Number: 4,955,227
[45] Date of Patent: Sep. 11, 1990

[54] APPARATUS FOR INSPECTING GLASS BOTTLES

[75] Inventors: Toshiki Fujita, Tokyo; Hirokazu Kimura; Yoshihiro Yamato, both of Yokohama, Japan

[73] Assignee: Toyo Garasu Kabushiki Kaisha, Tokyo, Japan

[21] Appl. No.: 209,952

[22] Filed: May 25, 1988

[30] Foreign Application Priority Data

| May 27, 1987 | [JP] | Japan | 62-130475 |
| Aug. 20, 1987 | [JP] | Japan | 62-205214 |
| Aug. 27, 1987 | [JP] | Japan | 62-214082 |

[51] Int. Cl.⁵ .............................................. B07C 5/34
[52] U.S. Cl. ................................................ 73/104
[58] Field of Search ............................ 73/865.8, 104; 198/339.1; 209/522, 523, 530, 531, 533, 592, 600–602, 604; 177/52; 33/501.04, 533, 538

[56] References Cited

U.S. PATENT DOCUMENTS

| 2,734,627 | 2/1956 | Shields | 209/522 |
| 2,925,835 | 2/1960 | Mojonnier et al. | 177/52 |
| 3,080,659 | 3/1963 | Wolford | 209/523 |
| 3,249,223 | 5/1966 | Johnson et al. | 209/531 |
| 3,273,251 | 9/1966 | Saizon | 33/533 |
| 3,313,409 | 4/1967 | Johnson | 209/526 |
| 3,400,815 | 9/1968 | Bell et al. | 209/531 |
| 3,819,047 | 6/1974 | Sorbie | 209/530 |
| 3,869,802 | 3/1975 | Pirner | 73/104 |
| 3,923,158 | 12/1975 | Fornaa | 209/531 |
| 4,278,173 | 7/1981 | Pemberton et al. | 209/522 |
| 4,407,379 | 10/1983 | Pryor et al. | 177/52 |
| 4,433,785 | 2/1984 | Riggs et al. | 209/523 |
| 4,693,012 | 9/1987 | Cesna | 33/533 |

FOREIGN PATENT DOCUMENTS

| 213797 | 3/1987 | European Pat. Off. | 209/523 |
| 3208976 | 5/1983 | Fed. Rep. of Germany | 209/523 |

*Primary Examiner*—Robert Raevis
*Attorney, Agent, or Firm*—Wenderoth, Lind & Ponack

[57] ABSTRACT

An apparatus for inspecting glass bottles generally comprises an operation table, an annular conveyor passage onto which glass bottles to be inspected are conveyed one-by-one and on which the bottles are moved slidably, and a turn table coaxially disposed inside the annular conveyor passage. A plurality of guide members are circumferentially mounted on the peripheral surface of the turn table, and a plurality of bottle inspecting stations are disposed circumferentially and spaced equally therearound. The inspecting stations include a down sealing surface measuring station for measuring the down sealing surface of the lip portion of each bottle, an outer diameter and perpendicularly measuring station for measuring outer diameters of the various portions of each bottle and an inner diameter measuring station for measuring the inner diameter of the lip opening. The bottles inspected or measured are conveyed out of the conveying passage and selectively divided into defective bottles and satisfactory bottles.

5 Claims, 4 Drawing Sheets

APPARATUS FOR INSPECTING GLASS BOTTLES

BACKGROUND OF THE INVENTION

This invention relates to an apparatus for inspecting glass bottles, and more particularly to an apparatus for inspecting glass bottles capable of automatically measuring various portions of a glass bottle, such as weight, inclination of a sealing surface of a top lip opening, outer diameter of a shell or barrel portion, the perpendicularity of the glass bottle, outer and inner diameters of the top lip opening and the like, in a sequential measuring process by means of a plurality of inspecting devices located circumferentially about an inspecting table.

In general, bottles made of glass, called glass bottles or merely bottles hereinafter, are periodically taken out as samples during a production process thereof for spot inspecting or measuring the respective portions thereof, for example, measuring the weight of the glass bottle, the inclination of the top surface of the lip opening, the diameter of the barrel or shell portion, the overall height, and the like of the glass bottle. A control chart is drawn on the basis of the thus measured results for quality control of the glass bottles being manufactured.

The inclination of the top surface of the lip opening of a glass bottle relative to the reference surface of the bottom of the glass bottle is generally called down sealing surface. The down sealing surface has been measured in a conventional technique by abutting the contact of a dial gauge against the top portion of the lip opening to measure distances from the reference surface to the top surface at a plurality of portions of the glass bottle while rotating the glass bottle on a rotary measuring table about the vertical axis of the bottle and by comparing the measured distances, whereby the down sealing surface is calculated.

However, the top surface of the lip opening portion of a glass bottle often has minutely waved portions formed during the manufacturing process. Accordingly the conventional measuring method using a dial gauge has not been expected to exactly measure the down sealing surface because of the existence of the waved portions formed on the top surface of the glass bottle.

Moreover, in the conventional measuring method, since the glass bottles are periodically sampled during the manufacturing process for randomly measuring the dimensions of the glass bottle, such as the lip portion, the neck portion, the barrel portion and the bottom portion, and measured or inspected by means of a vernier caliper or other measuring gauges, this conventional measuring technique also gives rise to problems of the measuring accuracy, the measuring efficiency, and the like which result in deficient quality control.

SUMMARY OF THE INVENTION

Accordingly, an object of this invention is to substantially eliminate the difficulties or problems encountered in the conventional technique described above and to provide an apparatus for inspecting glass bottles in order to obtain glass bottles having superior quality.

Another object of this invention is to provide an apparatus for inspecting glass bottles in a sequential manner with a plurality of stations for inspecting or measuring the down sealing surface of each glass bottle, outer diameters of various portions thereof, perpendicularlity thereof, the inner diameter of the lip opening thereof, and the like.

A further object of this invention is to provide an apparatus for inspecting glass bottles capable of automatically performing various inspections and measurements simultaneously at respective stations.

These and other objects can be achieved according to this invention by providing an apparatus for inspecting glass bottles comprising an operation table, an annular conveyer which is mounted on the operation table and on which bottles to be inspected are mounted in a slidable manner, an annular turn table coaxially disposed inside the annular conveyer and provided with a plurality of guide members circumferentially disposed on the peripheral surface of the turn table, a take-in conveyer operatively connected to the annular conveyer for introducing bottles to be inspected one by one thereinto, a take-out conveyer operatively connected to the annular conveyer for discharging the bottles inspected one by one therefrom, and a plurality of inspecting stations arranged with equal spacing in the circumferential direction around the outer peripheral surface of the annular conveyer, the inspecting stations including a down sealing surface measuring station, an outer diameter measuring station, and an inner diameter and perpendicularity measuring station.

According to the structural or arrangement of the bottle inspecting apparatus of this invention, the glass bottles are conveyed one-by-one intermittently on the annular conveyer and stopped at every inspecting station. The inspecting stations are arranged in an equally spaced manner, so that the various measurements or inspections of the respective portions of the glass bottles can be automatically simultaneously performed. Thus, a control chart can be easily prepared on the basis of the data from the respective stations, thereby being capable of carrying out the highly graded quality control of the bottles manufactured.

In a preferred embodiment, the down sealing surface measuring station is equipped with an improved measuring device which includes a measuring plate having a flat surface to be forcibly contacted with the top surface of the lip portion of a bottle to be inspected. The down sealing surface of the lip top portion of the bottle can be measured precisely by measuring the vertical distances of predetermined portions of the lip top portion from the reference surface by means of linear gauges arranged on the circumferential portions of a circle having a diameter larger than that of the lip opening.

In a further preferred embodiment, the outer diameter measuring station is equipped with a device having a linear gauge to measure the outer diameters of various portions of the bottle to be inspected. The linear gauge for measuring the diameter of the lower lip portion is supported by a resilient member to be vertically movable so that the measuring probe of the linear gauge can abut positively against the lower lip portion to be measured.

These and other preferred embodiments of the glass bottle inspecting apparatus of this invention will be described in further detail hereunder with reference to accompanying drawings.

DESCRIPTION OF THE PREFERRED EMBODIMENTS

Figure 1:
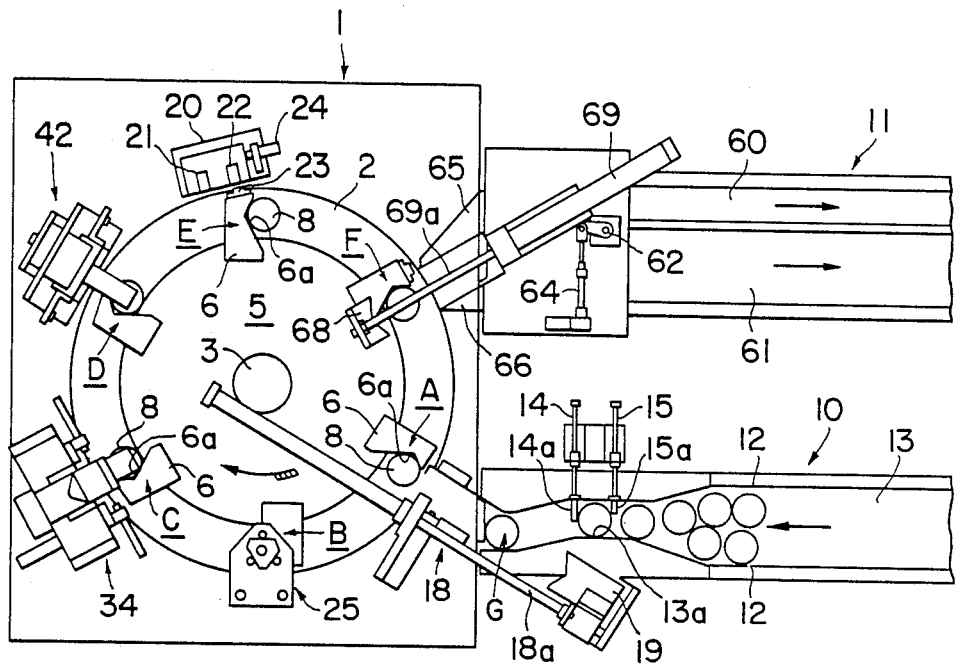
FIG. 1 is a plan view showing one embodiment of a glass bottle inspecting apparatus according to this invention.

Referring to FIG. 1, which is a plan view of a glass bottle inspecting apparatus according to this invention, an annular conveying passage 2 is stationarily secured to an operation table 1, and a turn table 5 is coaxially disposed inside the annular conveying passage 2 to be rotatable in the clockwise direction as viewed in FIG. 1 from above about a central shaft 3. A plurality of guide pushers 6, six in the illustrated example, are mounted at equally spaced intervals on the outer peripheral surface of the turn table 5. The guide pushers 6 are secured to the turn table 5 with a clearance space provided between the lower surface thereof and the upper surface of the annular conveying passage 2, and are also provided with recesses 6a in their front surfaces, respectively, with respect to the rotating direction of the turn table 5, each of the recesses 6a having a shape suitable for receiving the barrel portions of a respective glass bottle 8 conveyed on the conveying passage 2. The glass bottle 8 is then pushed by the guide pusher 6 to be slidably moved on the conveying passage 2 in the clockwise direction.

A plurality of inspecting stations, six in the illustrated embodiment, are disposed on the operation table 1 around the outer peripheral portion of the conveying passage 2, the inspecting stations being equipped with various respective devices or equipment for inspecting or measuring the various portions of each glass bottle. The six inspecting stations comprise a first station A for measuring the weight of each glass bottle 8, a second station B for measuring the bottom rising, the down sealing surface and the overall height of the glass bottle 8, a third station C for measuring the barrel diameter, the outer diameter of the lip portion, and the perpendicularity of the glass bottle, a fourth station D for measuring the inner diameter of the lip opening, a fifth empty station E provided as a spare, and a sixth station F for discriminating the respective code or reference numbers of the respective glass bottles 8. The details of the respective stations A to F will be described hereinafter.

A take-in conveyer 10 for taking each glass bottle 8 to be inspected into the conveying passage 2 is operatively connected to the inlet side of the weight measuring station A and a take-out conveyer 11 for taking out each inspected glass bottle 8 is connected to the outlet side of the code number designating station F.

The take-in conveyer 10, in belt form, is equipped with guide members 12 at both sides and a conveyer passage 13 formed between the guide members 12, both extending in the longitudinal direction of the take-in conveyer 10. The conveyer passage 13 is reduced in width towards the operation table 1 and has a narrowest portion 13A enabling only one glass bottle 8 to pass, and two piston-cylinder assemblies 14 and 15 are supported in parallel to each other on portions of the guide member 12 corresponding to the narrowest portion 13a of the conveyer passage 13. The piston-cylinder assemblies 14 and 15 are equipped at their respective front ends with stop members 14a and 15a so as to be freely advanced into or retracted from the conveyer passage 13.

A sensor, not shown, for detecting the arrival of each bottle 8 at the outlet portion of the passage 13 is disposed at a portion denoted by the reference character G. The stop members 14a and 15a define a space therebetween having a longitudinal distance suitable for substantially accommodating one bottle 8. The stop members 14a and 15a are so operated that when the stop member 14a is retracted, the bottle 8 is conveyed to the portion G, when the stop member 14a is advanced and the stop member 15a is retracted, the bottle 8 is received in the space defined therebetween, and when the stop member 15a is advanced, the entrance of the next bottle 8 on the passage 13 on the upstreamside thereof is prevented, whereby the bottles 8 can be positively and precisely conveyed to the portion G one by one. When a bottle 8 arrives at the portion G, the sensor detects this fact and serves to stop the operation of the take-in conveyer 10. A transfer piston-cylinder assembly 18 is disposed on the operation table 1 at a portion between the station A and the portion G and has a piston rod 18a to the front end of which is secured a transfer claw member 19 which operates to transfer the bottle 8 from the portion G to the station A in accordance with the retraction of the piston rod 18a.

A weighing device is provided on the conveying passage 2 of the weight measuring station A so as to measure the weight of the bottle 8 placed on the weighing device. After the measurement of the weight of the bottle 8, the bottle is then transferred to the second station B for measuring the down sealing surface of the lip portion thereof. This transfer is performed by rotating the turn table 5 about the central shaft 3 thereof by controlling an electric drive motor, not shown, so that the turn table is intermittently rotated by angular increments each of 60 degrees in the illustrated example. The rotation angles may be set to, for example 45° or 30°, in accordance with the number of stations.

Figure 2:
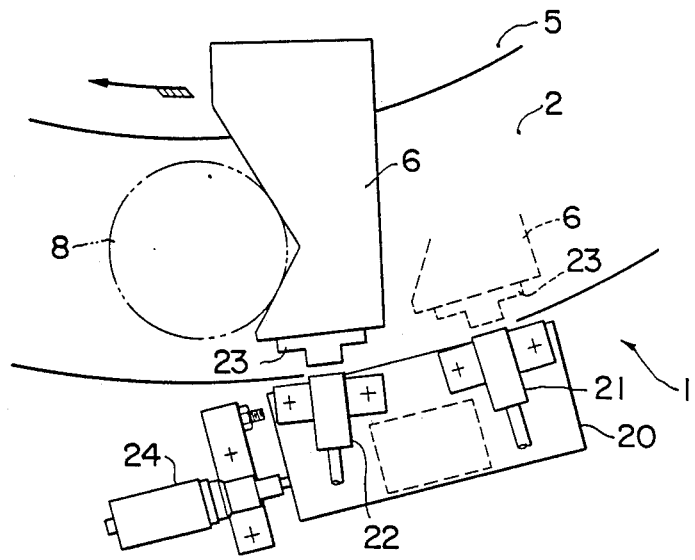
FIG. 2 is a partial plan view of a device for intermittently stopping a rotary table of the apparatus shown in FIG. 1.

FIG. 2 is a plan view showing a mechanism for intermittently stopping the rotation of the turn table 5, in which a sensor mounting plate 20 is positioned on the operation table 1 at one portion thereof along the outer periphery of the conveying passage 2, and a pair of sensors 21 and 22 are disposed on the sensor mounting 20, while all guide members 6 are provided with protruding portions 23 respectively at end portions thereof on the side opposed to the sensors 21 and 22. The sensor mounting plate 20 is adapted to be circumferentially movable, and the circumferential displacement is measured by means of a micro-gauge 24.

During the clockwise rotation of the turn table 5, when the protruding portion 23 of one guide member 6 approaches the sensor 21 disposed upstreamside of the rotation, shown by dotted lines in FIG. 2, the sensor 21 detects the approaching of the guide member 6 and operates to reduce the rotating speed of the turn table 5 to finally stop the guide member 6 when this guide member approaches the other sensor 22 as shown by solid lines precisely at a position corresponding to the sensor 22. According to this invention, the turn table 5 is reversely rotated to a position at which the protruding portion 23 corresponds to the first mentioned sensor 21 for the various other measuring processes described hereinlater. That is in this state, the guide member 6 is returned to a position corresponding to the sensor 21 while the glass bottle 8 to be inspected remains on the conveying passage 2 at a position shown by a two-dot and dash line in FIG. 2. Accordingly, in the case where six stations A to F are disposed, as in this example, six bottles 8 remain as shown on the conveying passage with respect to the respective guide members 6.

The micro-gauge 24 is utilized for minute adjustment of the stopping position, and in fact, when the barrel diameters of the respective bottles 8 are different from each other, the minute adjustment is performed by the micro-gauge 24. Therefore, according to the apparatus of this invention, the glass bottles 8 can be stopped exactly at predetermined positions of the respective stations A to E by only stopping the turn table 5 exactly at one point corresponding to one station.

A down sealing surface measuring device 25 is mounted at a part of the down sealing surface measuring station B at which the bottom rising of the bottle 8 is simultaneously measured or inspected.

Figure 3:
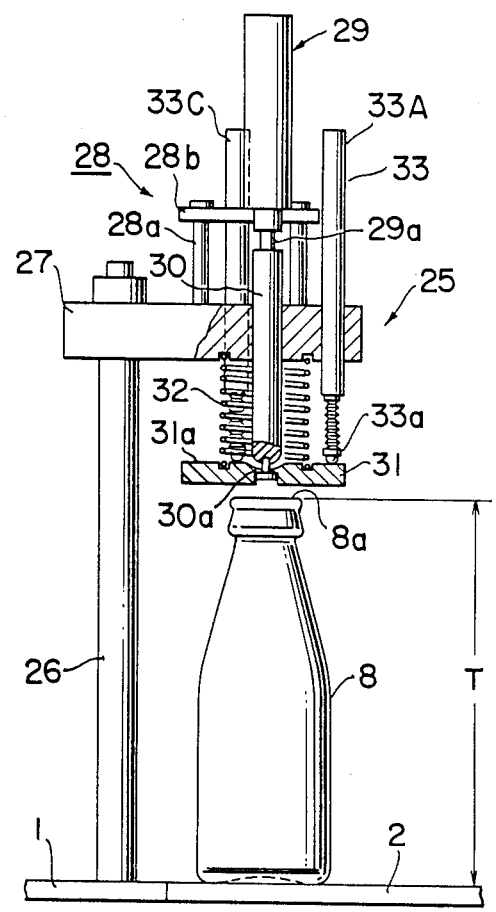
FIG. 3 is an elevation of a down sealing surface measuring device of the apparatus shown in FIG. 1.

Referring to FIG. 3 showing a side view of the down sealing surface measuring device 25, a support column 26 stands vertically on the operation table 1, and a support stand 27 is supported as a cantilever by the upper part of the support column 26 in parallel to the table 1. A mounting device 28 comprising leg parts 28a and an attachment plate 28b is mounted on the upper surface of the support stand 27. To the mounting plate 28b is vertically secured a piston-cylinder assembly 29 provided with a piston rod 29a having an outer end by which a measuring plate 31 is supported by way of a rod 30. A small gap 30a is defined between an upper surface 31a of the measuring plate 31 and the lower surface of the rod 30 to allow free inclination of the plate 31, and a coil spring 32 having an outer diameter larger than the inner diameter of the lip opening of the bottle 8 is interposed between the measuring plate 31 and the lower surface of the support stand 27.

Figure 5:
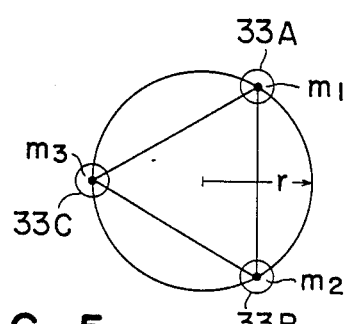
FIG. 5 is a planar diagram showing an arrangement of three linear gauges.

Three linear gauges 33 (33A, 33B and 33C) are mounted on the support stand 27 in an arrangement schematically indicated in FIG. 5, in which the front probing ends of the linear gauges 33A, 33B and 33C constitute the apexes of a equilateral triangle. The measuring probe 33A of the linear gauge 33a, for example, is urged downwardly so as to abut against the upper surface 31a of the measuring plate 31. In a preferred embodiment is utilized a linear gauge in which a linear displacement can be determined as an output of a differential transferring device in which a core of a probe is moved in a coil.

Figure 4:
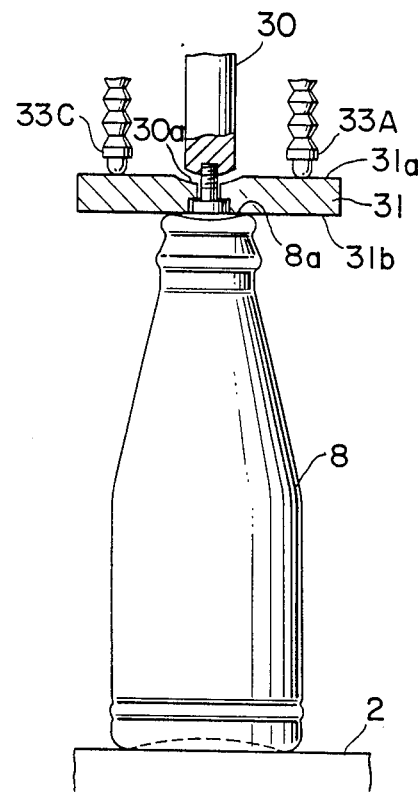
FIG. 4 is a partial elevation, part in section, of the down sealing surface measuring device with a measuring plate abutting against the top lip surface of the bottle to be inspected.

FIG. 4 shows a state in which the measuring plate 31 is lowered from the position shown in FIG. 3 to a position at which the lower surface 31b thereof abuts against the end surface 8a of the lip opening of the glass bottle 8. The measuring plate 31, which is supported by way of the rod 30 as described before, is pressed against the lip portion of the bottle 8 with an inclination coincident with the top inclination of the bottle lip surface 8a. The down sealing surface is measured by means of the three linear gauges 33A, 33B and 33C in accordance with the degree of the parallelism of the measuring plate 31 relative the reference surface, which is the upper surface of the conveying passage 2. The three linear gauges 33 abut against the upper surface 31a of the measuring plate 31 in the positional relationship shown in FIG. 5. Under these conditions, the down sealing surface K is calculated as follows:

$$K = D \cdot \frac{\sqrt{2}}{3r} \cdot \sqrt{(m1 - m2)^2 + (m2 - m3)^2 + (m3 - m1)^2} \quad (1)$$

in which: m1, m2 and m3 are values measured by the gauges 33A, 33B and 33C, respectively; the letter r denotes the radius of the circumscribing circle of the triangle shown in FIG. 5; and the letter D denotes the outer diameter of the lip opening of the bottle being inspected.

The down sealing surface K can be thus calculated by substituting the measured values of the linear gauges 33 into the equation (1) and can be easily and speedily obtained by storing the operating equation (1) in a computer, for example.

According to the above described example, the overall bottle height T, shown in FIG. 3, can be calculated by substituting the measured values m1, m2 and m3 into the following equation (2).

$$T = \text{offset value} + \left[ \frac{m1 + m2 + m3}{3} + \frac{K}{2} \right] \quad (2)$$

The offset value is the height from the upper surface of the annular conveying passage 2 to the zero point of the three linear gauges 33A, 33B, and 33C.

Figure 6:
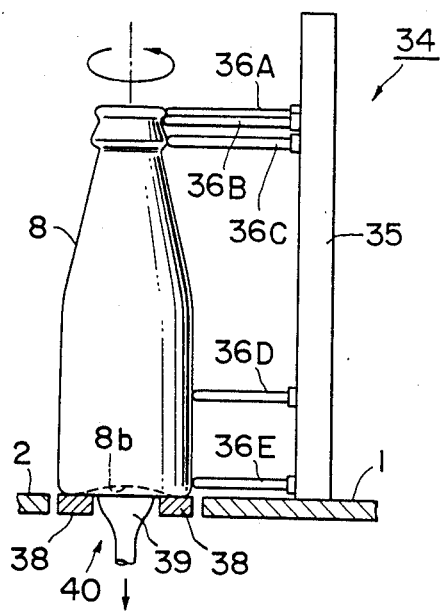
FIG. 6 is an elevation of a device for measuring an outer diameter of a bottle portion provided in the apparatus shown in FIG. 1.

At the diameter measuring station C is mounted a diameter measuring device 34 for measuring the outer diameter of the barrel portion, the lip portion and like portions of the bottle 8, and the perpendicularity of the glass bottle. FIG. 6 is a side view of the diameter measuring device 34, in which a stand 35 is mounted on the operation table 1 in a vertically extending manner. A plurality of, five in the illustrated embodiment, sensors 36 (36A, 36B, 36C, 36D and 36E) for detecting and measuring outer diameters of respective portions of the bottle are mounted on the vertical stand 35 in a vertically separated arrangement. The sensors 36A, 36B, 36C, 36D and 36E respectively detect and measure the diameter of the upper lip portion, the diameter of the lower lip portion, the diameter of a swollen portion of the lower lip, the diameter of the barrel portion, and the diameter of the lowermost bottom portion of the bottle 8.

At the station C, the glass bottle 8 to be inspected is placed on an annular rotating plate 38, and the bottom of the bottle 8 can be stationarily held by means of a sucking device 40 provided with a sucking head 39. That is, as shown in FIG. 6, since the bottom portion 8b of the glass bottle 8 is downwardly sucked by means of the sucking head 39, the bottle 8 is rotated with the circumferential surface of the bottom portion 8b pressed downwardly against the annular rotating plate 38. As described above, since the bottle 8 is forcibly sucked downwardly, there is no need for positioning an extra mechanism for supporting the bottle on the side thereof.

The principle used in measuring the outer diameter of the glass bottle will be described hereunder with reference to FIG. 7, in which it is prescribed that the rotational axis O of the rotary measuring table 38 is spaced from a reference axis X—X by a distance D, and the glass bottle 8 to be inspected is placed on the measuring table 38 at a position offset by a distance $\epsilon$ from the center of the measuring table 38. The characters $m_i$ and $m_{i+\pi}$ represent the measured values at positions at times when the glass bottle 8 is counterclockwisely rotated by the circumferential angles of $\theta$ and $\theta+\pi$ from the reference line P.

Figure 7:
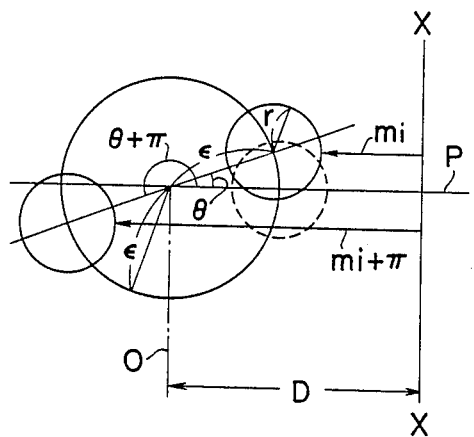
FIG. 7 is a diagram explaining the principle of measuring the outer diameter of the glass portion.

Under the condition indicated in FIG. 7, the values $m_i$ and $m_{i+\pi}$ are expressed by the following equations:

$$m_i = D - \epsilon \cdot \cos \theta_i - \qquad (3)$$

$$m_{i+\pi} = D + |\epsilon \cdot \cos (\Theta_{i+\pi})| - r \qquad (4)$$

Note that in equation 4 that $\cos (\Theta_{i+\pi})$ should be treated as an absolute value, since it is the absolute distance which is of concern. The sum of these values is expressed as:

$$m_i + m_{i+\pi} = 2(D - r) \qquad (5).$$

Therefore, an outer diameter d at a portion of the bottle to be measured is expressed as:

$$d = 2r = 2D - (m_i + m_{i+\pi}) \qquad (6).$$

Accordingly, the outer diameter at any portion of the bottle can be calculated on the basis of the equation (6) by detecting the distances $m_i$ and $m_{i+\pi}$ from the reference axis of the circumferential two points on the diameter at an optional part of the glass bottle. The values $m_i$ and $m_{i+\pi}$ can be measured by means of a linear gauge, the outer diameter at the desired portion of the glass bottle being thus measured according to the principle described with reference to FIG. 7.

Figure 8:
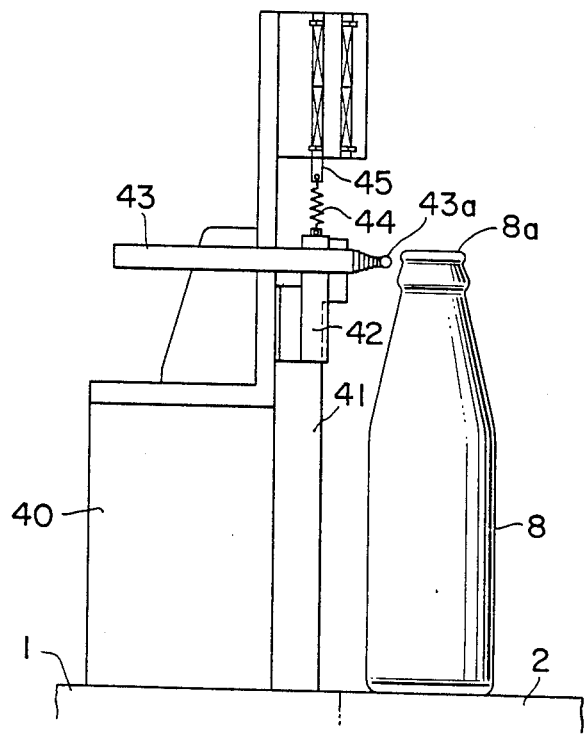
FIG. 8 is an elevation showing one example of a device for measuring the outer diameter of the lower lip portion of a bottle.

In the example shown in and described with reference to FIG. 6, the sensors 36A and 36B for measuring the outer diameters of the upper and lower lip portions of the glass bottle 8 are fixed to predetermined parts of the vertical stand 35. In an actual measurement, the measurement of the overall height of the glass bottle ordinarily includes a measurement error caused in the manufacturing process thereof, and accordingly, the vertical height of the lip portion is not always uniform. In order to compensate for this error, it is necessary to arrange the sensors for measuring the diameter of the lower lip portion of the bottle 8 in a position suitable for always correctly measuring the same lip portions of the bottles to be measured. FIG. 8 shows one device according to this invention for satisfying this requirement, in which the diameter measuring sensor is resiliently suspended in a manner described hereunder.

Referring to FIG. 8, a support column 40 is vertically mounted on the operation table 1 and is provided with a guide rail 41 extending vertically, along which a slider 42 is mounted to be vertically slidable. On the slider 42 is mounted a diameter measuring device, such as a pneumatically operated micrometer 43 disposed in a horizontal plane and having a measuring element 43a of a short column shape suitable for measuring the outer diameters of the lower lip portions of the glass bottle 8. The pneumatic micrometer 43 is suspended by a fixing plate 45 through a resilient member such as a coil spring 44. By the installation of the device shown in FIG. 8, the measuring element 43a can be always positioned exactly at the lip portions of the bottle to be inspected.

The perpendicularity is measured by calculating outputs from a lip diameter sensor (36A) and a bottom portion sensor (36E). In the calculation, the outer circumference of a bottle is divided into 100 sections, central coordinates of the lip and the bottom portion at each 100 points is determined, the absolute values of the differences between the central coordinates at the 100 points is determined, and the largest of the absolute values is used to determine perpendicularity.

Figure 9:
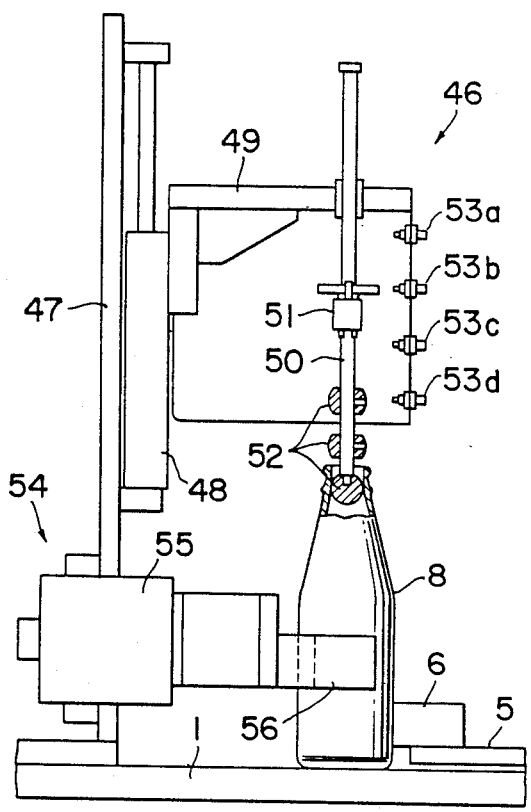
FIG. 9 is an elevation of a device for measuring the inner diameter of the lip opening of the glass bottle.
Figure 10:
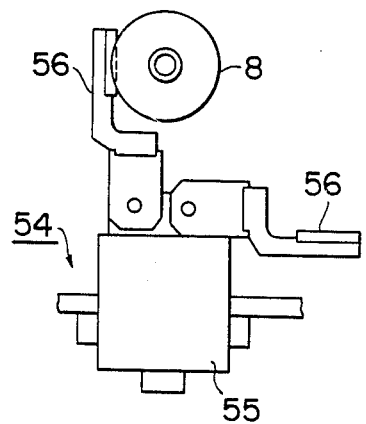
FIG. 10 is a plan view of a bottle holding mechanism.

The station D for measuring the inner diameter of the lip opening of the glass bottle 8 has a structure described hereunder with reference to FIG. 9.

A device 46 for measuring the inner diameter of the lip opening of the glass bottle 8 is provided at the station D and is supported by a movable plate 49 to be vertically movable. The movable plate 49 is also supported by a vertical column 47 standing vertically on the upper surface of the operation table 1 to be vertically movable through a cylinder assembly 48. The measuring device 46 comprises a gauge rod 50 supported by the movable plate 49 through a member 51 so as to extend in a direction perpendicular thereto, and three ball gauges 52 coaxially mounted on the gauge rod 50 in a vertically separated state, the uppermost ball gauge having a diameter slightly larger than that of the intermediate ball gauge, which has a diameter slightly larger than that of the lowermost ball gauge. The inner diameter of the lip opening of the bottle 8 can, accordingly, be measured by inserting the ball gauges 52 in the manner of limit gauges and sensing the state of passage of the ball gauges through the lip opening by means of sensors 53 (53a through 53d).

During this measurement of the inner diameter of the lip portion by means of the ball gauges 52, the glass bottle 8 is stationarily held by a bottle holding mechanism 54 which holds the barrel portion of the glass bottle 8. The bottle holding mechanism 54 comprises a bottle holding claw 56 and a cylinder assembly 55 adapted to open or close the claw 56. Accordingly, the insertion of the ball gauges 52 into the lip opening of the bottle 8 can be carried out smoothly without accidentally toppling over the glass bottle 8.

Concerning the station E, as described hereinbefore, since no specific member or device is provided on the conveying passage 2, the existence of such an empty station will leave the possibility for its use in the future as a spare station.

There is further provided a reference or code number discriminating mechanism, not shown, for reading out the reference numbers of the respective bottles marked on the bottom surfaces thereof on the downstream side of the station F, but since such a designation mechanism per se is known, the details thereof are omitted herein.

As described hereinbefore, the various values or data measured at the respective stations are transferred together with the reference numbers of the glass bottles inspected or measured into a control box, not shown, and the controlled data is then transferred into a computer, in which mold cavity numbers of glass bottle molding machines are preliminarily stored. Data concerning the respective mold cavities can thus be regulated or adjusted on the basis of the data from the control box and displayed as a control chart. Accordingly, the occurrence of a defective glass bottle as a product can be easily discriminated by viewing the control chart, based on which quick action against further occurrence of the defective product can be promptly taken. Moreover, in view of the control chart, it will be found that the respective dimensions of the various portions of the glass bottles to be continuously inspected have tendency to gradually increase or decrease with respect to the prescribed standard values, and according to this tendency, quick action can be taken for manufacturing glass bottles having substantially the same dimensions or sizes, whereby quality control of the glass bottles to be manufactured as products can be precisely and quickly performed.

Figure 11:
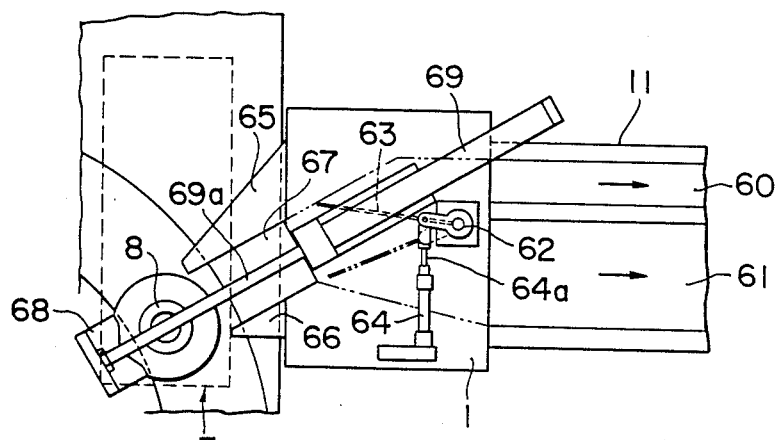
FIG. 11 is a plan view showing a system for conveying bottles from the bottle inspection apparatus.

FIG. 11 is a plan view of a take-out conveyer 11 operatively sequentially connected to the reference number discriminating station F. The take-out conveyer 11 comprises an defective product conveyer 60 and a non-defective or satisfactory product conveyer 61. A director plate 63 is swingably supported on a pivot shaft 62 at the entrance of the conveyers 60 and 61. A base end part of the director plate 63 is coupled to the outer end of a piston rod 64a of a swingable piston-cylinder assembly 64 secured to the operation table 1 so that the free end, i.e., the distal end, of the director plate 63 can be projected into a guide passage 67 defined by a pair of guide plates 65 and 66.

A discharge piston-cylinder assembly 69 is installed above the guide passage 67 and provided with a member 68 movable along the passage 67. This discharge piston-cylinder assembly 69 has a piston rod 69a. When this piston rod 69a is retracted, the glass bottles 8 after being inspected or measured are directed to the entrances of the conveyers 60 and 61 from the station F in accordance with the quality of the inspected bottles. In this example, for example, when the director plate 63 is projected into the guide passage 67 by the action of the swingable piston-cylinder assembly 64, the glass bottles are conveyed onto the satisfactory product conveyer 61, whereas the glass bottles are conveyed into the defective product conveyer when the director plate 63 is retracted from the guide passage 67. The actuation of the swingable piston-cylinder assembly 64 may be controlled manually or in response to a control signal from the computer, whereby the discharge or recovery of the defective products can be easily made.

In a preferred modification, the defective glass bottles will be discharged in the order in which they are measured by constructing the directing and conveying mechanism so that only one bottle can rest on the defective product conveyer 60. Then, according to this, arrangement, the discharged defective glass bottles and the data obtained by the control box can be easily correspondingly referred to each other even if the reference number discriminating mechanism fails to discriminate the reference number of the defective glass bottle. In addition, the glass bottle products can be separated into defective ones and satisfactory ones on one take-out conveyer 11, so that the space for installation of the take-out conveying system can be minimized.

It should be understood that this invention has been described hereinabove with reference to a preferred embodiment thereof, but is not limited to this embodiment and various changes and modifications may be made without departing from the scope or spirit of the inventions.

What is claimed is:

1. An apparatus for inspecting bottles made of glass, comprising:
   an inspecting operation table;
   an annular conveying passage means on said operation table for having bottles to be inspected moved thereon;
   a take-in conveying means for introducing bottles to be inspected onto said conveying passage means;
   a turn table coaxial with said annular conveying passage means, said turn table having a peripheral surface with a plurality of guide means disposed thereon for guiding and moving bottles along said annular conveying passage means;
   a take-out conveying means for discharging inspected bottles from said conveying passage means; and
   a plurality of bottle inspecting stations circumferentially spaced on said operation table adjacent said conveying passage means for inspecting bottles on said conveying passage means;
   said plurality of bottle inspecting stations including an inspection station for inspecting a down sealing surface of a glass bottle, said inspection station comprising a support column extending vertically upward from said operation table, a support member extending horizontally from an upper portion of said support column, a piston-cylinder assembly mounted on said support member, said piston-cylinder assembly having a vertically reciprocable piston rod, a measuring plate swingably supported on the outer end of said piston rod, a coil spring disposed between said measuring plate and said support member, and a plurality of linear gauges mounted on said support member, said gauges equally circumferentially spaced in a circle, and said gauges having gauge probes for contacting a back surface of said measuring plate to measure the distance from a reference point to said back surface.

2. The apparatus as set forth in claim 1, wherein:
   said plurality of linear gauges comprises three linear gauges, and said gauge probes of said three linear gauges are located at the apexes of an equilateral triangle.

3. An apparatus for inspecting a down sealing surface of a glass bottle, comprising:
   an inspecting operation table;
   a support column extending vertically upward from said operation table;
   a support member extending horizontally from an upper portion of said support column;
   a piston-cylinder assembly having a vertically reciprocable piston rod;
   a measuring plate swingably supported on the outer end of said piston rod;
   a coil spring disposed between said measuring plate and said support member; and
   a plurality of linear gauges mounted on said support member, said gauges equally circumferentially spaced in a circle, and said gauges having gauge probes for contacting a back surface of said measuring plate to measure the distance from a reference point to said back surface.

4. The apparatus as set forth in claim 3, wherein:

said plurality of linear gauges comprises three linear gauges, and said gauge probes of said three linear gauges are located at the apexes of an equilateral triangle.

5. An apparatus for inspecting bottles made of glass, comprising:

an inspecting operation table;

an annular conveying passage means on said operation table for having bottles to be inspected moved thereon;

a take-in conveying means for introducing bottles to be inspected onto said conveying passage means;

a turn table coaxial with said annular conveying passage means, said turn table having a peripheral surface with a plurality of guide means disposed thereon for guiding and moving bottles along said annular conveying passage means;

a take-out conveying means for discharging inspected bottles from said conveying passage means; and a plurality of bottle inspecting stations circumferentially spaced on said operation table adjacent said conveying passage means for inspecting bottles on said conveying passage means;

said plurality of bottle inspecting stations including a first inspection station for inspecting a down sealing surface of a glass bottle, said first inspection station comprising a support column extending vertically upward from said operation table, a support member extending horizontally from an upper portion of said support column, a piston-cylinder assembly mounted on said support member, said piston-cylinder assembly having a vertically reciprocable piston rod, a measuring plate swingably supported on the outer end of said piston rod, a coil spring disposed between said measuring plate and said support member, and a plurality of linear gauges mounted on said support member, said gauges equally circumferentially spaced in a circle, and said gauges having gauge probes for contacting a back surface of said measuring plate to measure the distance from a reference point to said back surface;

said plurality of bottle inspecting stations further including a second inspection station for inspecting the outer diameter of a lip portion of a glass bottle, said second inspection station comprising a support column extending vertically upward from said operation table, a linear gauge having a horizontally extendable measuring probe, and means for supporting said linear gauge from said support column such that said linear gauge is vertically resiliently movable relative to said support column, whereby said measuring probe can be vertically positioned at a glass bottle lip portion which is to be measured; and said plurality of bottle inspecting stations further including a third inspection station for inspecting an inner diameter of a lip opening of a glass bottle, said third inspection station comprising a support column extending vertically upward from said operation table, a movable plate vertically movably supported by said column, a gauge rod supported by said movable plate for vertical movement by said movable plate into and out of a glass bottle to be inspected, said gauge rod having a plurality of ball limit gauges thereon for inspecting an inner diameter of a lip opening of the glass bottle, and sensors for detecting which ball limit gauges cannot pass through the lip opening.

* * * * *